(12) United States Patent
Bloch

(10) Patent No.: US 7,401,459 B2
(45) Date of Patent: Jul. 22, 2008

(54) FISHING LINE

(76) Inventor: Klaus Bloch, Schwalbenweg 17, D-53757 St. Augustin (DE)

( * ) Notice: Subject to any disclaimer, the term of this patent is extended or adjusted under 35 U.S.C. 154(b) by 0 days.

(21) Appl. No.: 10/562,108

(22) PCT Filed: Jun. 26, 2003

(86) PCT No.: PCT/EP03/06743

§ 371 (c)(1), (2), (4) Date: Dec. 22, 2005

(87) PCT Pub. No.: WO2005/001177

PCT Pub. Date: Jan. 6, 2005

(65) Prior Publication Data

US 2006/0154065 A1    Jul. 13, 2006

(51) Int. Cl.
*D02G 3/22* (2006.01)

(52) U.S. Cl. .......................... 57/230; 57/235

(58) Field of Classification Search .............. 57/210, 57/231, 236–238
See application file for complete search history.

(56) References Cited

U.S. PATENT DOCUMENTS

| | | | |
|---|---|---|---|
| 3,024,589 A | | 3/1962 | Vaughan |
| 5,288,552 A | * | 2/1994 | Hollenbaugh et al. ....... 428/357 |
| 5,364,699 A | * | 11/1994 | Hollenbaugh et al. ....... 428/357 |
| 5,802,828 A | * | 9/1998 | Adorno ........................ 57/232 |
| 5,881,492 A | | 3/1999 | Abiru et al. |
| 6,335,093 B1 | * | 1/2002 | Mori et al. ................... 428/370 |
| 6,855,423 B2 | * | 2/2005 | Fidan et al. .................. 428/375 |
| 6,905,764 B2 | * | 6/2005 | Hornez et al. ............... 428/357 |
| 2002/0127398 A1 | | 9/2002 | Andrews et al. |
| 2005/0144927 A1 | * | 7/2005 | Hornez et al. ................. 57/237 |
| 2005/0233143 A1 | * | 10/2005 | Tsukamoto et al. .......... 428/364 |
| 2006/0154065 A1 | * | 7/2006 | Bloch ........................... 428/375 |
| 2006/0162312 A1 | * | 7/2006 | Patel et al. ..................... 57/210 |

FOREIGN PATENT DOCUMENTS

| | | |
|---|---|---|
| DE | 44 02 630 C1 | 8/1995 |
| GB | 1 232 450 | 5/1971 |
| JP | 2003065441 A * | 3/2003 |
| WO | 92/03922 | 3/1992 |
| WO | WO 2005001177 A1 * | 1/2005 |

\* cited by examiner

*Primary Examiner*—Shaun R Hurley
(74) *Attorney, Agent, or Firm*—Pauley Petersen Erickson

(57) ABSTRACT

A fishing line including a core of at least one multifilament yarn based on synthetic organic fibrous materials such as polyethylene of an ultra-high molecular weight, and a casing formed from polytetrafluorethylene (PTFE) film tape which is wound around the core in the S direction and the Z direction or vice versa.

36 Claims, 1 Drawing Sheet

FISHING LINE

BACKGROUND OF THE INVENTION

1. Field of the Invention

This invention relates to a fishing line.

2. Discussion of Related Art

Fishing lines with a high resistance to breaking are known, which are either designed as monofilaments or are of a multitude of braided cords, wherein synthetic fibers of great strength are thus employed, such as discussed in German Patent Reference DE 44 02 630 C1, for example. As a protection against damage, such threads and cords are provided with a casing, for example by coating or extrusion, such as discussed in PCT International Publication WO 9203922 A1. The employment of adhesive materials, such as hot melt adhesives, for improving the adhesiveness between the casing and/or the filaments is disadvantageous in connection with known hybrid fishing lines. Such bonding layers/adhesive layers have a negative effect on the mechanical properties and fatigue strength under reversing bending strains of the fishing line, and over time also become brittle, disintegrate and decompose.

Braided or twisted fishing lines also have one disadvantage that the elongation at break is not inconsiderably increased by twisting. It is also possible when using the fishing line in salt water, while retrieving the fishing line water droplets are caught between the individual filaments and leave salt crystals behind when they dry, which leads to destruction by friction when unreeling the fishing line again.

SUMMARY OF THE INVENTION

One object of this invention is to provide a fishing line which will satisfy the high demands when used in salt water and for large fish. Among the demands made on fishing lines are a large support capacity with little wear, nip resistance, large resistance to breaking, very low elongation at break, a smooth surface for good sliding properties, a water-repellent and dirt-repellent surface, tinting capability, good resistance to knotting, high fatigue strength under reversing bending strain, flexibility, UV resistance, weather resistance, transverse strength as high as possible, and high abrasion resistance.

This object is attained with a fishing line discussed in this specification and in the claims, which is also universally employable and easy to handle.

The fishing line in accordance with this invention is distinguished because it has a core of at least one multifilament yarn on the basis of synthetic organic fiber materials, and a casing made from small film strips of polytetrafluoroethylene (PTFE), which are firmly wound on the core in the S-direction and Z-direction or vice versa. Preferably, the winding takes place alternatingly. With thicker cores, fishing lines, it is also possible to first wind two or more small film strips in the S-direction or Z-direction, or vice versa, and thereafter at least one small film strip in the other direction around the core.

The fishing line formed in accordance with this invention meets all requirements with regard to high strength, breaking resistance and transverse strength, along with a very low elongation at break, and because the casing is made of small film strips of PTFE, it not only has very good sliding properties, but is also UV-resistant, water-repellent, dirt-repellent, has a high abrasion resistance and its appearance can also be changed by tinting.

Advantageous characteristics of the fishing line in accordance with this invention can be taken from the distinguishing features discussed in the dependent claims.

It is possible to wind the small film strips made of PTFE around the core of multifilaments in such a way that a closed sheathing, a casing, is formed.

In accordance with this invention, the core made of synthetic, organic, endless filaments, which can be formed individually or in bundles, can include multifilament yarns or spun yarns, which lends the yarn the required breaking resistance with low elongation at break and the high support capacity, while small film strips made of PTFE as the sheathing provide the required exterior properties, such as sliding properties, fatigue strength under reversing bending strain, abrasion resistance, UV-resistance, weather resistance, water-repellent properties, chemical resistance, and the ability to be tinted. With the small film strips it is possible to provide a sheathing which is closed like a casing wherein, because of winding a small film strip made of PTFE around the core, such as a flat structure in contrast to filaments which have a linear structure, the transverse strength of the core is additionally increased, because with this winding the breaking resistance of the small film strips made of PTFE as the sheathing contribute to the increase of the cross breaking resistance of the filaments of the core. A circular cross section of the fishing line can also be achieved by winding the small film strips around the core. In one preferred embodiment of this invention, the fishing line is wound with only two small film strips made of PTFE, which form the casing, wherein one of the small film strips is wound around the core in the S-direction and the other small film strip in the Z-direction. The small film strips are attached to the core or to each other over the entirety one side. A firm connection between core and casing is created by the appropriate firm winding of the small film strips around the core.

The construction of the fishing line of only two components without a coupling agent, such as the thermoplastic material of the core and the casing, results in a high degree of flexibility and a fatigue strength under reversing bending strains.

The small film strips made of PTFE are preferably wound with 200 to 400 turns/m around the core. For the sheathing, the small film strips used for producing the fishing line preferably have a width of 1 to 2 mm, in particular 1 to 1.5 mm. Small film strips made of PTFE of 220 to 880 dtex can be used for the sheathing. In this case, 350 to 450 dtex is a preferred range.

Such small film strips made of PTFE are produced by cutting up very thin PTFE films. Preferably, the small film strips are made of 100% pure PTFE. PTFE can be permanently subjected to up to 260° C. and will tolerate short time temperature peaks, use temperature, up to 300° C. PTFE is not flammable, because the limiting oxygen index (LOI) lies at 95% $O_2$. The hairline breaking resistance of small film strips made of PTFE lies in the range between 2.7 to 3.0 cN/dtex with an elongation at break of at most 6%.

In comparison with sheaths of thermoplastic materials, for example, extruded on the line, the resistance to knotting of the fishing line in accordance with this invention is also improved if the casing is made from small film strips of PTFE because, with the firm winding of the small film strips on the core, the cross breaking resistance of the core is also increased.

In accordance with this invention, high-strength filaments made of organic synthetic fibers, in particular multifilament yarns with an elongation at break of less than 8%, preferably less than 6%, and preferably less than 4%, are preferably employed for the core of the fishing line. The linear density breaking resistance of the multifilaments employed for the core should be at least 20 cN/dtex.

In order to achieve maximum strength along with the least possible elongation at break of the fishing line in accordance with this invention, the high-strength filaments and multifilament yarns forming the core are aligned with each other substantially straight and extending parallel with each other, for example they are neither twisted in themselves nor with each other. Thus, the fishing line does not curl. With a core having filaments or multifilament yarns that are not twisted, the original elongation at break is maintained, for example it is not increased, since no structural elongation is added, such as is created, for example, during twisting or braiding of filaments. The multifilament yarns used for the core are preferably also not twisted.

It is also possible in connection with the fishing line of this invention to slightly twist the filaments/multifilament yarns forming the core with each other by 1 to 30 turns/m, wherein untwisted multifilament yarns can also be employed. Here, too, the low elongation at break is substantially maintained. But, in connection with fishing lines of great breaking resistance and very low elongation at break, it is also possible to twist the filaments/multifilament yarns forming the core with each other with more than 30 turns, but preferably no more than 200 turns/m.

In one embodiment, the fishing line in accordance with this invention has the core and the casing formed by the small film strips made of PTFE and are mechanically put together into a unit without any adhesive layers, such as a glue layer, hot melt adhesive or other binders, by the firm winding of the small film strips made of PTFE around the core. A large degree of flexibility and a fatigue strength under reversing bending strains thus result.

Preferably, filaments in the form of multi filament yarns are employed for the core. Multifilament yarns are of individual filaments of a thickness of less than 10 μm, wherein a multifilament yarn of 550 dtex is of approximately 85 to 90 filaments of a thickness of 6 μm, for example. However, the filaments can even be much thinner, up to a diameter of 2 μm. Multifilament yarns of different sizes, depending on the application purpose, can be employed for the core, for example 220 dtex, 440 dtex, 1,200 dtex, preferably within the range of 110 to 1,800 dtex. Multifilament yarns, having filaments that are not twisted together, are customarily used.

In one embodiment of the fishing line in accordance with this invention, high-strength filaments/multifilament yarns made of polyethylene of an ultra-high molecular weight (UHMW-PE) of 110 to 1,700 dtex and a linear density breaking resistance of at least 20 dN/dtex, in particular at least 25 dN/dtex, and an elongation at break of less than 8%, in particular less than 6%, are used. This is a core which lends a very large support capacity with a very low elongation at break to the fishing line. Customarily, identical filaments/multifilament yarns are used for the core of the fishing line. However, in case of a requirement for additional properties it is also possible to embody the core with filaments/multifilament yarns which are structurally different with respect to their material and/or shape. In another embodiment of the fishing line in accordance with this invention, there is at least one conductive filament or filament yarn on the basis of a thermoplastic material in addition to the filaments/multifilament yarns made of synthetic organic fiber materials of the core. Filaments/filament yarns having an electrical resistance of $10^0$ to $10^{10}$ Ohm/cm are employed as such conductive filaments/filament yarns. The conductive filament yarns preferably contain nylon or a polyester as the thermoplastic material. Conductivity is achieved by the addition of carbon, wherein this can be contained in the filament and/or is vacuum-deposited onto it. A content of 5 weight-% carbon in relation to the filament is sufficient. Conductive filaments/ filament yarns of thin construction can be employed, preferably in the range of 18 to 40 dtex. Here, a conductive filament yarn preferably can have between 1 and 10 filaments. Nylon with a melting point in the range of approximately 215° C., or polyester with a melting point of approximately 255° C., are preferably used for the conductive filament yarns. The conductive filament/filament yarn also contributes to improving the adhesion of the filaments. However, the core of the fishing line should be predominantly of multifilament yarn of relatively great breaking resistance and low elongation at break and which has a small proportion of conductive filament yarn, preferably in the range of 3 to 12 weight-% in relation to the core. It is also possible for the multifilament yarns of the core of relatively great breaking resistance and low elongation at break to be twisted together with the conductive filament yarns, wherein the twisting can be provided as S- and/or Z-turns, wherein maximally up to 30 twisting turns/m are provided. Because of the twisting of the conductive filaments/ filament yarns together with the remaining multifilament yarns of the core, a reinforcing effect is thus achieved so that the transverse strength of the core is increased and therefore the knotting resistance of the fishing line is improved. With the twisting, wherein the thin conductive filament yarn is embedded in the surface of the remaining multifilament yarns of the core, the desired round shape of the cross section of the core, and therefore also of the fishing line, is better achieved. The core achieves the required smoothness, flexibility, abrasion resistance, water resistance and sea water-repellent properties, as well as UV-resistance, by the sheathing being made of the small film strips of PTFE.

In another embodiment, of the fishing line in accordance with this invention, there is a core of high-strength filaments of polyethylene of an ultra-high molecular weight (UHMW-PE) of 300 to 400 dtex and a linear density breaking resistance of at least 28%, and an elongation at tear of less than 4%, as well as conductive filament yarn on the basis of nylon or polyester of 3 to 8 weight-% in relation to the total weight of the core. The casing is formed by two small film strips of PTFE, one of which is wound around the core at 200 to 400 turns/m in the S-direction and the other in the Z-direction, or vice versa. The small film strips made of PTFE can have a width of 1 to 1.5 mm and the filaments/filament yarns and conductive filaments of the core are not twisted. A closed casing is formed by the winding with the small film strips made of PTFE. The water-repellent embodiment of the sheathing made of PTFE and its closed state prevent the penetration of the fishing line by water/saltwater, so that no salt crystals remain after drying, and the fishing line maintains its sliding ability and capability to function for winding and unwinding, for a long time.

Fishing lines in accordance with this invention have a high linear support capability which, when employing multifilaments made of UHMW-PE for the core, is at least 35 g/den (31.5 g/dtex).

When using multifilament yarns made of UHMW-PE of 200 dtex (200 dernier) for the core with a break resistance of 31 cN/dtex, or 35 g/den, a fishing line in accordance with this invention with a diameter of 0.19 mm has a support capability of approximately 8.1 kg, which is of 5.2 kg as the part of the core and 2.9 kg of the casing formed by the small film strips made of PTFE.

In a fishing line in accordance with this invention, with a diameter of 0.35 mm with multifilaments made of UHMW-PE of the core of 880 dtex (800 dernier), a supporting capacity of approximately 30 kg results, which is of 28 kg based on the core and further 2.5 to 3 kg of the sheathing of the core with small film strips made of PTFE.

Because the specific weight of the small film strips made of PTFE is higher than that of water, while one of the multifilaments of the core of, for example UHMW-PE, is slightly lower than that of water, it is possible to determine the weight of the fishing line by the proportion and the ratio of the weight of the core to the weight of the casing, so that it is somewhat heavier than water and does not float on the water, but sinks. The specific weight of the fishing line preferably lies in the range between approximately 1.5 to 1.8 g/cm$^3$. A heavier fishing line furthermore has the advantage that it can be cast from a reel better since it develops a higher kinetic energy. In this connection, the design of the non-twisted core made of filaments/multifilament yarns is also of advantage, because the fishing lines does not have a tendency to curl.

DESCRIPTION OF PREFERRED EMBODIMENTS

Figure 1:
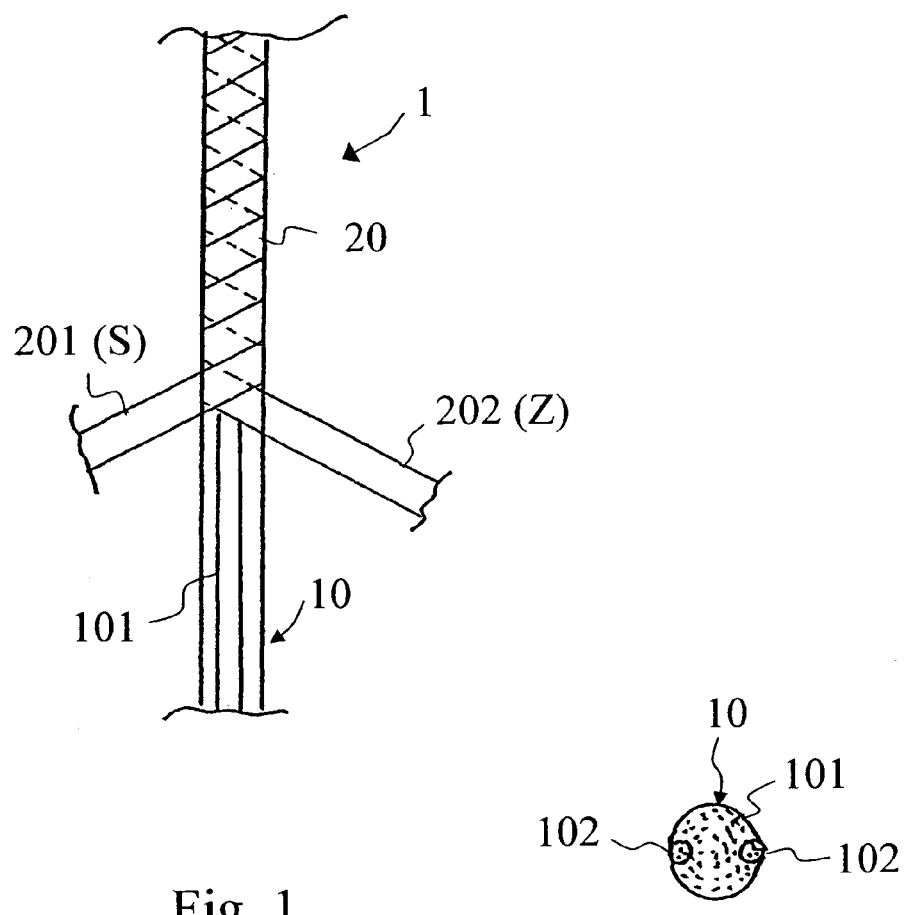
FIG. 1 is a schematic diagram of a fishing line manufacturing method, according to one embodiment.

The fishing line in accordance with this invention is schematically represented in FIG. 1, with the individual components of the manufacturing process. The fishing line 1 comprises the core 10 of filament yarns 101, which are of untwisted filament yarns extending parallel with each other, and wherein the filament yarns 101 are also arranged parallel side-by-side without twisting. Two small film strips 201, 202 made of PTFE are wound around the core 10, wherein the small film strip 202 is wound in the Z-direction and the small film strip 201 in the S-direction, or vice versa, wherein the two small film strips form a closed casing 20 made of PTFE. For example, the small film strips 201 and 202 are firmly wound around the core 10 with 200 to 400 turns/m. The full surface of one side is wound around the core, or around the first small film strip already applied there. Because the core 10 is wound with the small film strips 201, 202 in this way, the cross breaking resistance of the core 10, and therefore its resistance to knotting is improved. The core 10 and the sheathing 20 form a solid connection with each other without the use of any adhesives or the like.

Figure 2:
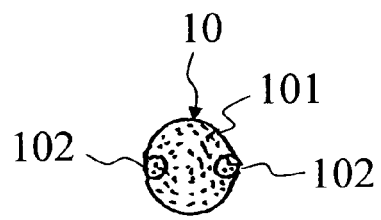
FIG. 2 shows a core of a fishing line, according to one embodiment of this invention.

In one embodiment of this invention, it is also possible, such as shown in FIG. 2, to construct the core 10 of the fishing line of different filaments/filament yarns 101, wherein in addition to filament yarns 101 made of a high-strength synthetic fiber, for example preferably UHMW-PE, one or two conductive filaments or filament yarns 102 are added, which either form the core, either not twisted together with the remaining multifilament yarns 101 or twisted together with it. The conductive filament(s) 102 consist(s) for example of thermoplastic polyester or nylon and each is made conductive by vacuum deposition of a small amount of carbon, for example 5 weight-% in relation to the filament. The conductive filament yarn can be of a few individual filaments and preferably has a reduced strength of, for example, 30 dtex. The core 10 in accordance with FIG. 2 is subsequently wound with two small film strips made of PTFE, as shown in FIG. 1, which form a continuous sheathing, which is also dirt-repellent.

EXAMPLE 1

A core is twisted together, for example in an S-rotation at 20 turns/m, from a multifilament yarn made of synthetic fibers of polyethylene of an ultra-high molecular weight UHMW-PE of a density of 0.97 g/cm$^3$, a breaking resistance of 3.1 N/tex, or 35 g/den, a module of elasticity of 97 N/tex, and an elongation at break of 3.6%, for example a Dyneema® fiber of 220 dtex, together with a conductive filament yarn of 22 dtex containing three filaments on the basis of nylon 6, as well as 5 weight-% of carbon applied by vacuum deposition on the surface, which has an electrical resistance of $10^6$ to $10^8$ Ohm/cm and an elongation at break of 53% and a breaking resistance of 2.9 cN/dtex. Subsequently, two small film strips made of PTFE of 420 dtex of a width of approximately 1.5 mm with 300 turns/m are wound around the core. The fishing line thus obtained has a diameter of 0.19 mm, has an elongation at break of 4% and has a linear support capacity of 8.1 kg of a proportion of the core of 5.2 kg and of the sheathing of small film strips made of PTFE of 2.9 kg. The fishing line is salt water-resistant, abrasion-resistant, has a smooth surface, is flexible, has a very good resistance to knotting and fatigue strength under reversing bending strain, is UV-resistant, is dirt-repellent and meets all requirements.

EXAMPLE 2

An untwisted core is produced from two multifilament yarns of 220 dtex and a multifilament yarn of 440 dtex of the same material as described in connection with Example 1, which is subsequently firmly wound with two small film strips made of PTFE of 420 dtex and a width of approximately 1.5 mm, wherein one small strip is wound in the S-direction and one small strip in the Z-direction around the core. Winding takes place at 300 turns/m. A fishing line of round cross section with a diameter of 0.35 mm is thus obtained, which has an elongation at break of 3.6% and a linear support capability of 31 kg.

EXAMPLE 3

A core is produced from a multifilament yarn of 440 dtex of the same material as described in connection with the Example 1, wherein the multifilament yarns, including their filaments, extend parallel with respect to each other. As shown in FIG. 1, the core is sheathed in two small film strips made of PTFE as described in Example 2, so that a closed sheathing is thus obtained. The fishing line thus obtained has a round diameter of a cross section of 0.28 mm, has an elongation at break of 3.6% and has a linear support capability of 15.5 kg.

The invention claimed is:

1. A fishing line, comprising: a core made of at least one multifilament yarn of a synthetic organic fiber material, and a casing made of small film strips of polytetrafluoroethylene (PTFE) which are firmly wound on the core in a S-direction and Z-direction, or vice versa, wherein the casing is formed of two small film strips made of PTFE, one of which is wound on the core in the S-direction and another of which is wound in the Z-direction, and one side of the small film strips is brought in its entirety into contact with the core, or on top of the other one, wherein the small film strips are wound on the core with 200 to 400 turns/m.

2. The fishing line in accordance with claim 1, wherein the small film strips made of PTFE are of a width of 1 to 2 mm for the core.

3. The fishing line in accordance with claim 2, wherein the small film strips made of PTFE are of 220 to 880 dtex.

4. The fishing line in accordance with claim 3, wherein the small film strips made of PTFE are of 330 to 450 dtex.

5. The fishing line in accordance with claim 4, wherein high-strength multifilament yarns with a linear density breaking resistance of at least 20 cN/dtex are used for the core.

6. The fishing line in accordance with claim 5, wherein high-strength multifilament yarns with an elongation at break of less than 8% are used for the core.

7. The fishing line in accordance with claim 6, wherein the high-strength filaments and filament yarns forming the core are substantially aligned to extend straight and parallel with each other.

8. The fishing line in accordance with claim 6, wherein the high-strength filaments and the filament yarns forming the core are slightly twisted together at 1 to 30 turns/m.

9. The fishing line in accordance with claim 6, wherein the high-strength filaments and the filament yarns forming the core are twisted together at more than 30 turns/m and less than 200 turns/m.

10. The fishing line in accordance with claim 9, wherein the core is formed from filaments of at least one of a different structure material and shape.

11. The fishing line in accordance with claim 10, wherein high-strength filaments/multifilament yarns made of polyethylene of an ultra-high molecular weight (UHMW-PE) of 110 to 1760 dtex and a linear density breaking resistance of at least 20 cN/dtex, and an elongation at break of less than 8%, are used for the core.

12. The fishing line in accordance with claim 11, wherein in addition to the filaments/filament yarns made of synthetic organic fiber materials, the core contains at least one conductive filament or filament yarn of a thermoplastic material.

13. The fishing line in accordance with claim 12, wherein the conductive filament/filament yarn has an electrical resistance of $10^0$ to $10^{10}$ Ohm/cm.

14. The fishing line in accordance with claim 13, wherein carbon is applied to the conductive filament/filament yarn by vacuum deposition or the conductive filament/filament yarn contains carbon.

15. The fishing line in accordance with claim 14, wherein the core contains 3 to 12 weight-% of the conductive filament/filament yarn.

16. The fishing line in accordance with claim 14, wherein the conductive filament/filament yarn contains one of nylon and polyester as the thermoplastic material.

17. The fishing line in accordance with claim 14, wherein a conductive filament yarn of 18 to 40 dtex is used.

18. The fishing line in accordance with claim 1, wherein the core has a linear support capacity of at least 35 g/den (31 g/dtex).

19. A fishing line, comprising: a core made of at least one multifilament yarn of a synthetic organic fiber material, and a casing made of small film strips of polytetrafluoroethylene (PTFE) which are firmly wound on the core in a S-direction and Z-direction, or vice versa, wherein the small film strips are wound on the core with 200 to 400 turns/m.

20. The fishing line in accordance with claim 1, wherein the small film strips made of PTFE are of a width of 1 to 2 mm for the core.

21. The fishing line in accordance with claim 1, wherein the small film strips made of PTFE are of 220 to 880 dtex.

22. The fishing line in accordance with claim 21, wherein the small film strips made of PTFE are of 330 to 450 dtex.

23. The fishing line in accordance with claim 1, wherein high-strength multifilament yarns with a linear density breaking resistance of at least 20 cN/dtex are used for the core.

24. The fishing line in accordance with claim 1, wherein high-strength multifilament yarns with an elongation at break of less than 8% are used for the core.

25. The fishing line in accordance with claim 1, wherein the high-strength filaments and filament yarns forming the core are substantially aligned to extend straight and parallel with each other.

26. A fishing line, comprising: a core made of at least one multifilament yarn of a synthetic organic fiber material, and a casing made of small film strips of polytetrafluoroethylene (PTFE) which are firmly wound on the core in a S-direction and Z-direction, or vice versa, wherein the high-strength filaments and the filament yarns forming the core are twisted together at 1 to 30 turns/m.

27. The fishing line in accordance with claim 1, wherein the high-strength filaments and the filament yarns forming the core are twisted together at more than 30 turns/m and less than 200 turns/m.

28. The fishing line in accordance with claim 1, wherein the core is formed from filaments of at least one of a different structure material and shape.

29. The fishing line in accordance with claim 1, wherein the core is made of at least one multifilament yarn of high-strength filaments/multifilament yarns made of polyethylene of an ultra-high molecular weight (UHMW-PE) of 110 to 1760 dtex and a linear density breaking resistance of at least 20 cN/dtex, and an elongation at break of less than 8%.

30. The fishing line in accordance with claim 1, wherein in addition to filaments/filament yarns made of synthetic organic fiber materials, the core contains at least one conductive filament or filament yarn of a thermoplastic material.

31. The fishing line in accordance with claim 30, wherein the conductive filament/filament yarn has an electrical resistance of $10^0$ to $10^{10}$ Ohm/cm.

32. The fishing line in accordance with claim 12, wherein one of carbon is applied to the conductive filament/filament by vacuum deposition and the conductive filament/filament contains carbon.

33. The fishing line in accordance with claim 12, wherein the core contains 3 to 12 weight-% of the conductive filament/filament yarn.

34. The fishing line in accordance with claim 12, wherein the conductive filament/filament yarn contains one of nylon and polyester as the thermoplastic material.

35. The fishing line in accordance with claim 12, wherein a conductive filament yarn of 18 to 40 dtex is used.

36. The fishing line in accordance with claim 1, wherein the core has a linear support capacity of at least 35 g/den (31 g/dtex).

* * * * *